UNITED STATES PATENT OFFICE.

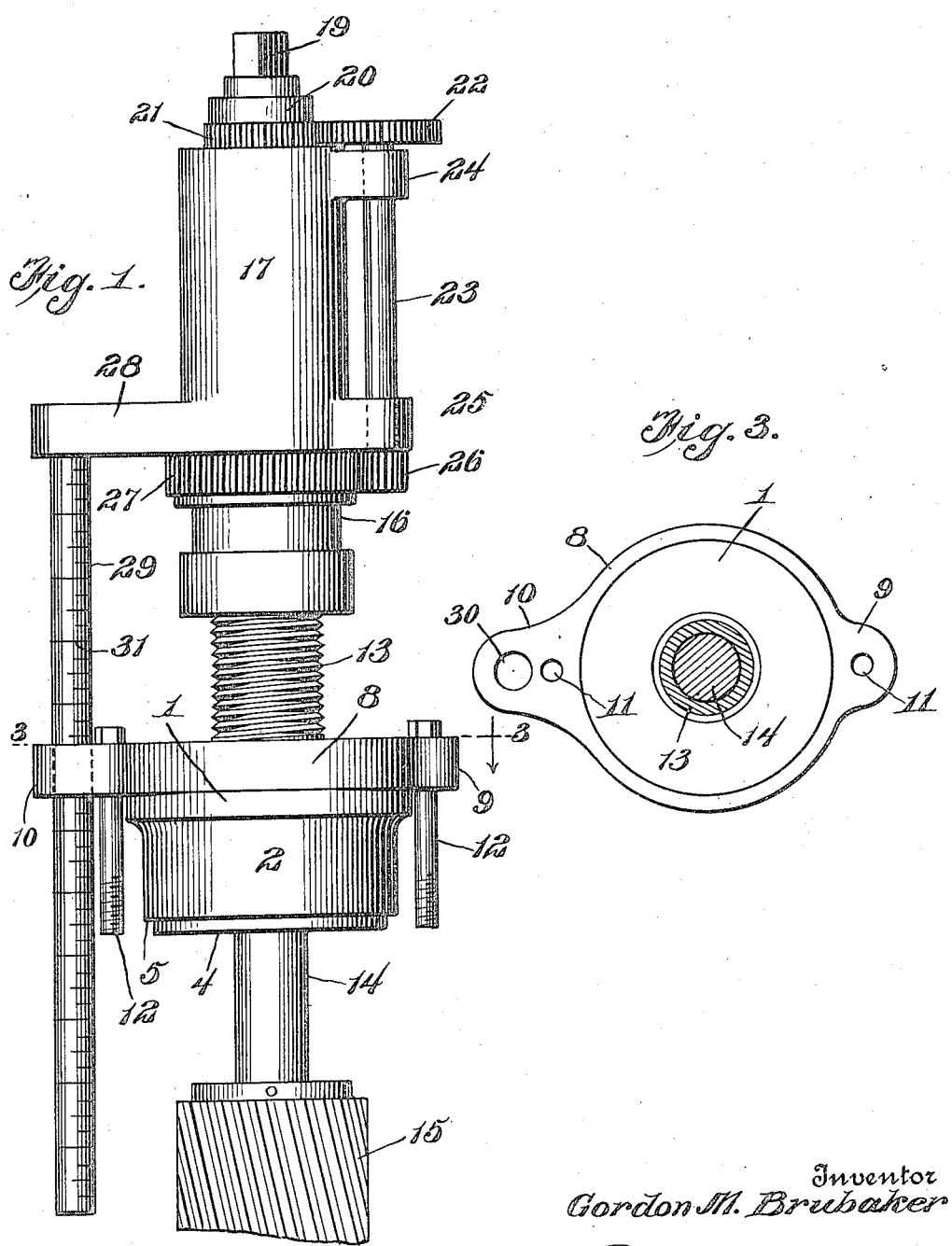

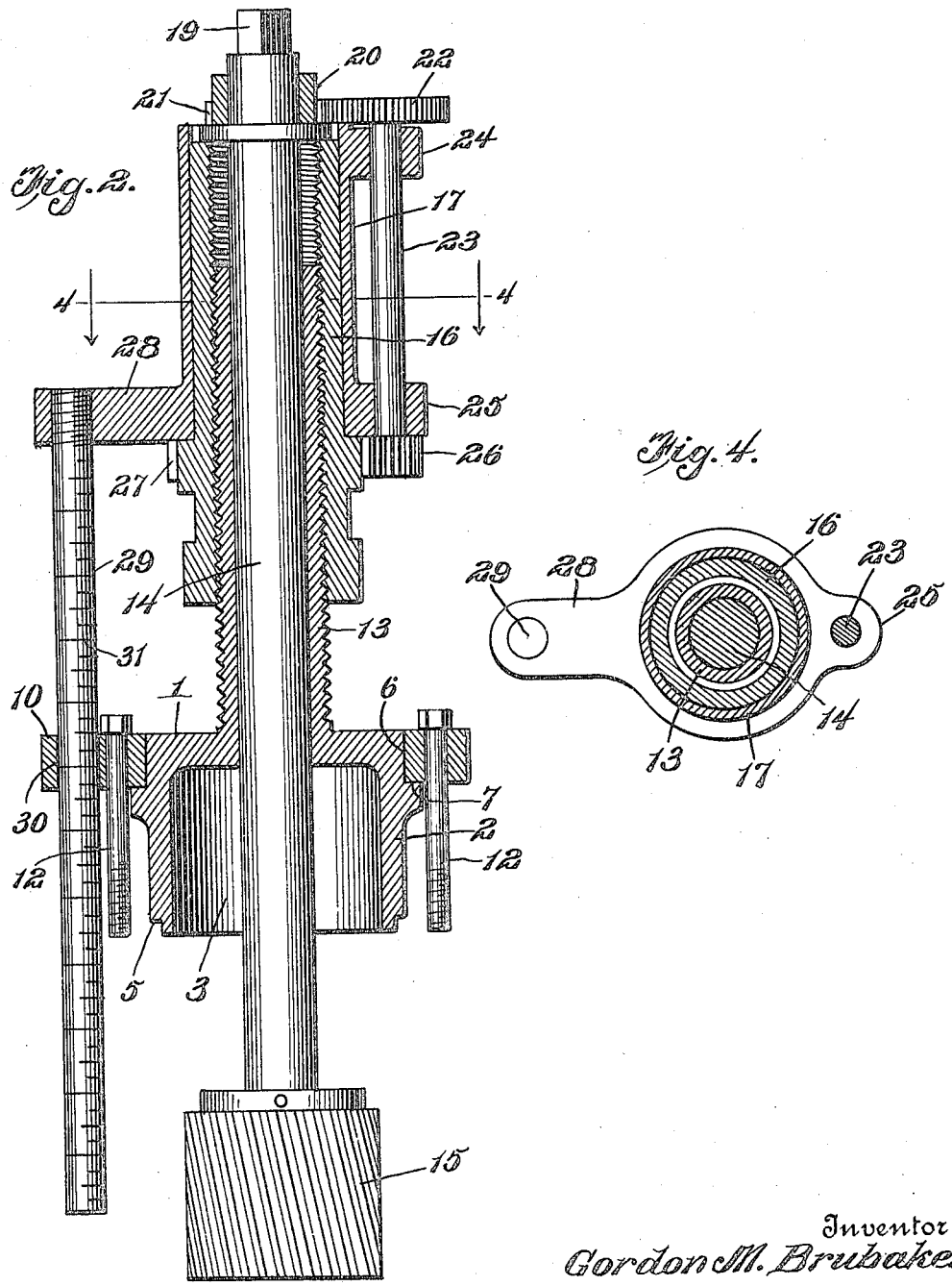

GORDON MARK BRUBAKER, OF MILLERSBURG, PENNSYLVANIA.

CYLINDER BORING OR REAMING MACHINE.

1,384,043.  Specification of Letters Patent.  Patented July 12, 1921.

Application filed March 9, 1920. Serial No. 364,417.

*To all whom it may concern:*

Be it known that I, GORDON MARK BRUBAKER, a citizen of the United States, residing at Millersburg, in the county of Dauphin and State of Pennsylvania, have invented new and useful Improvements in Cylinder Boring or Reaming Machines, of which the following is a specification.

This invention relates to a machine for boring or reaming cylinders, such as those of automobiles, steam engines and the like, and the object of the invention is to provide a simple, compact, easily operated and efficient type of machine of this character whereby cylinders may be quickly, accurately and smoothly bored.

The invention consists of the features of construction, combination and arrangement of parts, hereinafter fully described and claimed, reference being had to the accompanying drawings, in which:

Figure 1 is a side elevation of the machine, showing the cutting tool partially fed forward.

Fig. 2 is a vertical longitudinal section through the machine.

Fig. 3 is a transverse section on line 3—3 of Fig. 1.

Fig. 4 is a transverse section on line 4—4 of Fig. 2.

In the practical embodiment of my invention, I provide a boring or reaming machine comprising an attaching element consisting of a relatively stationary clamping member or head 1 having a tubular extension 2 providing a tool receiving cavity or chamber 3. This tubular extension 2 is provided at its lower or forward edge with a reduced projection 4 to fit within the usual groove or recess at the open end of the cylinder to be bored, said projection 4 being surrounded by an abutment shoulder 5 which bears against the under face of the cylinder. The head 1 is rabbeted to provide a recess 6 and an abutment shoulder 7. Fitted within said recess 6 and surrounding the head is a clamping ring 8 which bears against the abutment shoulder 7, and said ring 8 is formed at diametrically opposite sides with lugs 9 and 10 provided with openings 11 for the passage of attaching screws or bolts 12. The screws or bolts 12 are adapted, when the head 1 is placed in position upon the open end of the cylinder, to pass through openings in the cylinder flange to which the cylinder head is bolted, and said screws or bolts are either threaded into said openings or passed therethrough and provided with securing nuts, according to the character of the cylinder construction, to firmly and securely fasten the head 1 in position upon the cylinder.

The head 1 is provided with an outwardly extending inner bearing or guide sleeve 13, which is externally threaded and forms an extended bearing for a tool driving shaft 14 which extends therethrough and through the cavity or chamber 3, said tool driving shaft carrying at its inner or lower end a boring tool or reamer 15 of suitable construction. The sleeve 13 also forms a support for a feed device or traveler, said feed device or traveler comprising a hollow internally threaded feed spindle 16 journaled within an outer bearing sleeve 17, the internal threads of which spindle engage the external threads of the sleeve 13 whereby the traveler is adapted to be moved toward and from the head 1 at a constant and regulated rate of speed.

The shaft 14 is provided at its outer end with an abutment head or flange 18 bearing against the outer end of the feed spindle 16, and said shaft 14 is also provided at its outer end with an angular extremity 19 for the application of a crank handle or other suitable driving member, whereby it may be rotated to rotate the reamer 15 and simultaneously pressed forward to maintain the abutment flange 18 in contact with the feed spindle.

Fixed to the outer end of the shaft 14 between the flange 18 and the angular extremity 19 is a collar 20 provided with gear teeth 21 and forming a drive gear meshing with a gear 22 on a feed shaft 23. This feed shaft 23 is arranged parallel with the shaft 14 and is journaled in bearing bosses 24 and 25 formed upon one side of the outer bearing sleeve 17 and carries at its lower or inner end a gear pinion 26 meshing with gear teeth or a gear ring 27 formed or suitably provided upon the feed spindle 16. By this construction as the tool driving shaft 14 is revolved in a proper direction for a cutting action of the reaming tool 15, rotary motion in a proper direction will be transmitted to the spindle 16 for forward or downward travel upon the sleeve 13, thus permitting the shaft 14 to move forward to feed the reamer 15 along the cylinder with a speed proportionate to the cutting speed of the reamer. The gear element 27 or portion of the spindle on which it is formed provides an inner or bottom abutment against which the outer bearing sleeve 17 rests, thus maintaining the gear elements 26 and 27 in perfect meshing alinement and also providing a thrust surface whereby when the spindle 16 is turned manually in the reverse direction to that required for a feeding action the traveler may be moved rearwardly or outwardly on the sleeve 13 to permit the shaft 14 and cutter 15 to be adjusted backwardly to normal or starting position. Upon rotating the shaft 14 in a direction reverse to that required for a feed action, the shaft 23 will be revolved in a direction to move the traveler and cutting tool rearwardly or back to normal or starting position, as will be readily understood. The sleeve 17 is provided with an arm 28 carrying a guide rod 29 which is fitted to slide through a guide opening 30 formed in the lug 10 of the clamping ring 8, whereby the ring 8 and outer bearing sleeve 17 are fixed against rotation and the traveler properly guided for movement toward and from the attaching head or element 1. This rod 30 may be and preferably is provided with an indicating scale 31, graduated in inches and fractions thereof whereby the position of the reamer 15 within the cylinder may be at all times determined, as well as its extent of travel during its boring or reaming action.

In the operation of the machine, the traveler is adjusted rearwardly on the sleeve 13 to fully retract the tool driving shaft 14 and draw the reamer 15 to a position in which it will be housed within the cavity or chamber 3, thus disposing the reamer in starting position ready to begin its forward feeding and cutting action when the shaft 14 is operated. The attaching element is then placed in proper position upon the cylinder and fixed thereto by the bolts or screws 12, whereby the machine will be rigidly secured in position and the driving shaft 14 and cutter 15 supported and guided to maintain the cutting tool at all times concentric with the axis of the cylinder for a true boring action throughout its entire range of motion. A suitable driving element is then applied to the polygonal end 19 of the shaft 14 and said shaft started into action, causing the rotation of the cutter 15 whereby the cylinder will be bored, and as this boring action continues motion will be transferred through the shaft 23 to the rotary feed spindle 16 to advance the traveler at a rate corresponding to the cutting speed of the reamer 15, so that the shaft 14 may be moved forwardly to advance the reamer at a proper rate of speed during the cutting action, such operation being continued until the cylinder is bored throughout or to the extent required. By disconnecting the bolts or screws 12 the attaching member 1 may then be released and the machine detached from the cylinder in a ready and convenient manner.

It will be understood that as the shaft 14 is stayed and guided in its movements by its bearing engagement with the sleeve 13 and contact with the spindle 16, the reamer 15 will be caused to at all times run true and will be kept from wabbling or getting out of proper line and boring the cylinder at an angle, which is often the trouble with cylinder boring machines of ordinary construction. As the traveler will permit the reamer to feed forward at a regulated speed, corresponding to its speed of cut, the machine will operate to ream cylinders at a very rapid rate of speed and bore the same very smoothly and accurately. It will of course be understood that suitable means may be provided for driving the shaft 14 by motive power instead of by hand power when desired and that, as the machine is comparatively small in size and light in weight, it is readily portable and may be taken out on the road and used to bore locomotive or other cylinders in a rapid and convenient manner. The size of the machine may be varied as required to bore or ream cylinders of different sizes.

Having thus fully described my invention, I claim:—

1. A cylinder boring or reaming machine comprising a clamping head, means for securing the same to a cylinder, an elongated externally threaded inner bearing sleeve fixed to and extending from the clamping head, a tool driving shaft journaled in said head and sleeve, an outer bearing sleeve coupled to the tool driving shaft and in guided and slidable connection with the clamping head, a threaded feed spindle journaled in the outer bearing head and arranged to travel upon the threads of the inner bearing sleeve, and gearing between the tool driving shaft and feed spindle.

2. In a cylinder boring machine, an attaching head, means for securing the same to a cylinder, an elongated externally threaded sleeve carried by said attaching head, a tool driving shaft slidably and rotatably mounted in said sleeve, a boring tool carried by said shaft, a second boring sleeve in guided connection with said head, a feed spindle journaled in said second boring sleeve and having its threads engaging the threads of the externally threaded sleeve, and gearing mounted on the second boring sleeve and connecting the feed spindle with the tool driving shaft for operation thereby.

3. In a cylinder boring machine, a head, a clamping ring for clamping the same to a cylinder, said ring being revolubly mounted on said head and having means of attachment to the cylinder, an elongated externally threaded boring sleeve fixed to and projecting from the head, a tool driving shaft rotatably and slidably mounted in said sleeve, a boring tool carried by said shaft, a second boring sleeve, a guide member slidably and non-rotatably connecting said second boring sleeve with the clamping ring, a feed spindle journaled in said second boring sleeve and having internal threads meshing with the external threads of the first named boring sleeve, and gearing supported by said second boring sleeve and connecting said spindle with the tool driving shaft for operation thereby.

4. In a cylinder boring apparatus, an attaching head, a clamping ring for clamping the same to a cylinder, said ring being revolubly mounted on said head and having means of attachment to the cylinder, a tool driving shaft rotatable and longitudinally movable in said attaching element, a boring tool carried thereby, a traveler in direct feeding engagement with said attaching head, and gearing between the shaft and traveler for feeding the latter.

5. In a cylinder boring machine, an attaching head, means for attaching the same to a cylinder, an elongated externally threaded sleeve carried by said head, a tool driving shaft rotatably and longitudinally movable in said sleeve, a boring tool carried thereby, a traveler in feeding engagement with said sleeve, and gearing between the shaft and traveler for feeding the latter to advance the shaft.

6. In a cylinder boring machine, an attaching head, a ring for clamping the head to a cylinder, said ring being revolubly mounted on said head and provided with attaching means, an elongated externally threaded sleeve projecting from the head, a tool driving shaft rotatably and longitudinally movable in said sleeve, a second boring sleeve, means slidably connecting said second boring sleeve with the clamping ring and holding said parts from relative rotation, a traveler journaled in said second boring sleeve and in feeding engagement with the threads of the first-named boring sleeve, and gearing supported by the second boring sleeve for driving the traveler from the shaft for advancing the latter.

7. In a cylinder boring machine, an attaching element including a head adapted to be fixed to the cylinder and having an externally threaded bearing sleeve, a tool driving shaft rotatable and longitudinally movable in said head and sleeve, a boring tool carried thereby, a second bearing sleeve, an internally threaded feed spindle journaled in said second bearing sleeve and having the threads thereof engaging the threads of the first-named bearing sleeve, a guide rod carried by the second bearing sleeve and slidably engaging the attaching element, and feed gearing between the shaft and the feed spindle.

8. In a cylinder boring machine, an attaching element adapted to be fixed to the cylinder and comprising a head having an externally threaded sleeve and a clamping ring associated therewith, a tool driving shaft rotatably and longitudinally movable in said head and sleeve, a boring tool carried thereby, a second bearing sleeve, an internally threaded feed spindle journaled in said second bearing sleeve and having the threads thereof engaging the threads of the first-named bearing sleeve, a guide rod carried by the second bearing sleeve and slidably engaging the attaching element, and feed gearing between the shaft and the feed spindle.

9. In a cylinder boring machine, an attaching element adapted to be fixed to the cylinder and having an externally threaded bearing sleeve, a tool driving shaft rotatable and longitudinally movable in said head and sleeve, a boring tool carried thereby, a second bearing sleeve, an internally threaded feed spindle journaled in said second bearing sleeve and having the threads thereof engaging the threads of the first-named bearing sleeve, a guide rod carried by the second bearing sleeve and slidably engaging the attaching element, gears upon the driving shaft and spindle, and a feed shaft journaled on the second bearing sleeve and carrying gears meshing with the first-named gears.

In testimony whereof I affix my signature.

GORDON MARK BRUBAKER.